UNITED STATES PATENT OFFICE.

HERMAN JANSEN, OF SCHIEDAM, NETHERLANDS.

PRODUCTION OF SEED-YEAST FOR USE IN THE MANUFACTURE OF YEAST BY THE AERATION OR CLEAR-WORT PROCESS.

SPECIFICATION forming part of Letters Patent No. 724,293, dated March 31, 1903.

Application filed July 15, 1899. Serial No. 723,986. (No specimens.)

*To all whom it may concern:*

Be it known that I, HERMAN JANSEN, yeast manufacturer, a subject of the Queen of the Netherlands, residing at Schiedam, in the Kingdom of the Netherlands, have invented certain new and useful Improvements in the Production of Seed-Yeast for Use in the Manufacture of Yeast by the Aeration or Clear-Wort Process, of which the following is a specification.

This invention relates to improvements in the production of a seed-yeast or bub for use in the aeration or clear-wort process of making yeast.

The clear-wort-yeast-making process consists, as is known, in obtaining the clear wort without any husks from the mashed grist either by pressing, decantation, or filtration and cultivating the yeast in this clear wort. After fermentation the wort is brought into flat settling-tanks, where the yeast deposits itself. The clear wort that is formed above the yeast is run off and the remaining yeast collected. On account of air being blown into the wort during the fermentation this process is also called the "aeration" process.

It is well known that the seed-yeast constitutes by far the greatest difficulty in the clear-wort process. It is only possible to work for a short time with one and the same yeast, for the yeast degenerates after some generations, and in order to be able to continue working fresh yeast must be produced by a less remunerative process or must be obtained from another factory. It often happens that new seed-yeast received from another factory does not work well, and consequently gives bad results. In a word, the seed-yeast is the uncertain factor in this process, and any one who has worked with the aeration process knows what difficulties the seed-yeast presents therein and how often this seed-yeast is the sole cause of irregular and bad yields and faulty yeast. These losses and difficulties of the clear-wort process entirely disappear when the seed yeast or bub is produced according to my improved process. It is then possible to work continually with yeast produced by the clear-wort process, and it is never necessary to renew the seed-yeast by obtaining it from another factory or by another yeast-making process, while uniform yields and splendid yeast are always insured.

My improved process consists in preparing a mash, for example, with a small quantity of water, so as to produce a wort of high specific gravity—viz., 1.0744 to 1.0832, (water equals one,) which wort is separated from the mash by decantation, filtering, or in any other suitable manner at the end of the saccharification process. For this purpose the grist can be mashed for two hours and then allowed to saccharify for two hours, after which the high-density wort is drawn off. The high-density unacidified wort so obtained is then cooled down to the fermentation temperature, (about 32° centigrade,) and concentrated clear spent wash of a specific gravity of 1.129, for example, and of such acidity that from twenty-five to sixty cubic centimeters of an aqueous solution containing forty grams of NaOH per liter—that is, a "normal solution"—will be required to neutralize one hundred cubic centimeters thereof is added to the said wort until the acidity of the mixture is such that from ten to eighteen cubic centimeters of normal solution of soda are required to neutralize one hundred cubic centimeters thereof. Dry or pressed seed-yeast—*i. e.*, yeast which has been separated from the mash in which it has grown—or mother-yeast—*i. e.*, yeast mixed with wort in which it has grown—or a mixture of seed and mother yeast is then added to the said mixture of wort and spent wash in order to provoke fermentation. If seed-yeast is used, then one part of yeast to one hundred parts of grist used in forming the clear wort is sufficient. If mother-yeast is used, then ten per cent. of the quantity of clear wort will do. If both seed and mother yeast are used, proportionate quantities of each should be taken. The fermentation of this wort is deemed sufficiently far advanced to enable it to be used as a "bub"—*i. e.*, as starting-yeast for the fermentation of ordinary mashes—when the density has been reduced beyond half its original value, but not so far that the fermentation is lessening. A portion of the yeast so obtained is preferably kept back for use as seed-yeast in preparing a fresh quantity of bub, as above described, the remainder being used in the usual way for fermenting mashes of any density—for example, 1.028 to 1.404—i. e., the main mash or principal wort.

A convenient method of working my improved process consists in using the residue of the mash from which the high-density wort has been obtained, as above described, in forming the main or principal wort of any desired lower density by adding water to the said residue. This main wort may have a specific gravity of from 1.028 to 1.044, for example.

The acidity of the mixture of high-density wort and concentrated spent wash from which the bub is formed should be varied to some extent in accordance with the acidity of the wort to which the bub is to be added. Thus if the wort into which the bub is to be shown is only slightly acid then the bub must have an acidity such that about fifteen cubic centimeters of a normal solution of soda will be required to neutralize one hundred cubic centimeters thereof. If, however, the acidity of the principal wort is very high—such that, for instance, three or four cubic centimeters of a normal solution of soda will be required to neutralize one hundred cubic centimeters thereof—then the acidity of the bub must be reduced so that ten cubic centimeters of a normal solution of soda will be required to neutralize one hundred cubic centimeters thereof.

The clear concentrated spent wash can be obtained by allowing the spent wash which runs from the distilling apparatus to pass into a tank, where the solid part settles down to the bottom. The liquid part, which remains at the top, has generally (when making yeast) a specific gravity of about 1.008, and an acidity such that from two to four cubic centimeters of a normal solution of soda will be required to neutralize one hundred cubic centimeters thereof. This clear spent wash is concentrated by heating it in an open receptacle until it has a specific gravity of 1.129, with an acidity such that twenty-five to sixty cubic centimeters of a normal solution of soda will be required to neutralize one hundred cubic centimeters thereof. The concentration preferably takes place in two open low vats, which are heated independently of each other. For this purpose an open fire, steam from a boiler, or even exhaust-steam can be used. Any concentrating process is, however, applicable whereby a concentrated spent wash of a specific gravity of about 1.129 can be produced without its burning or settling onto the heating-tubes and walls of the vat in which the concentration takes place.

In cases where the fermented wort is not distilled the fermented wort is concentrated.

I wish to point out that it is absolutely necessary for carrying out my improved process to employ only high-grade wort, preferably of a specific gravity of 1.0832, and strongly-evaporated spent wash of at least equal density for the yeast material, and that the main feature of this invention lies in this high grade of the wort and in the concentration of the spent wash. With a light wort and an unconcentrated spent wash it would be impossible to attain the desired result—viz., an undegenerated yeast—since the density and acidity of the yeast material would be too low to insure a pure fermentation.

By the fermentation of the high-grade wort with concentrated clear spent wash a regeneration of the seed-yeast takes place, which is advantageous and produces such a pure and powerful yeast that in a yeast-factory working on the aeration process and wherein my improved process has been practiced for a long time the manufacture has been started and continued only with yeast produced in the works itself.

By "dry yeast" I understand compressed distillers' yeast, such as is used by bakers. Seed-yeast is the same kind of dry yeast, but which is used to provoke fermentation. By "mother-yeast" is understood a part of the bub, which is not added to the principal mash, but is kept back in order to serve to provoke fermentation in wort for forming bub. Thus it often happens that wort for forming bub is brought into fermentation by both seed-yeast and mother-yeast together.

What I claim is—

1. A process of producing a seed-yeast (or bub) for use in the manufacture of yeast by the aeration or clear-wort process, consisting in propagating seed-yeast in a yeast material composed of wort of a specific gravity of at least 1.0744, and concentrated clear spent wash of such acidity that at least twenty-five cubic centimeters of an aqueous solution containing forty grams of NaOH per liter will be required to neutralize one-hundred cubic centimeters thereof, substantially as hereinbefore described.

2. A process for producing a seed-yeast (or bub) and using the same in the manufacture of yeast by the aeration or clear-wort process, consisting in mixing wort of a specific gravity of at least 1.0744 with concentrated clear spent wash of such acidity that at least twenty-five cubic centimeters of an aqueous solution containing forty grams of NaOH per liter will be required to neutralize one hundred cubic centimeters thereof, bringing this mixture into fermentation, and, after sufficient generation of yeast, adding the bub to the wort which it is desired to ferment, substantially as hereinbefore described.

3. A process for the production of bub in the manufacture of spirit and pressed or German yeast by the aeration or clear-wort process, consisting in mixing a portion of unsoured or unacidified yeast material of a specific gravity of at least 1.0744 from the mash-tun with concentrated clear spent wash of such acidity that at least twenty-five cubic centimeters of an aqueous solution containing forty grams of NaHO per liter will be required to neutralize one hundred cubic centimeters thereof, bringing the mixture into fermentation by a suitable yeast and, after sufficient generation of yeast, adding the said mixture or bub to the wort which is desired to ferment, substantially as described.

4. In the manufacture of spirits and yeast, the addition of concentrated distillers' wash of such acidity that at least twenty-five cubic centimeters of an aqueous solution containing forty grams of NaHO per liter will be required to neutralize one hundred cubic centimeters thereof, to the wort of a specific gravity of at least 1.0744 immediately after the saccharification and subsequent cooling of the said wort, substantially as and for the purpose described.

5. A process for the manufacture of spirits or yeast wherein clear spent wash brought to a concentration such that not less than twenty-five cubic centimeters of a "normal" solution of soda will be required to neutralize one hundred cubic centimeters of the liquid, is added to the mash or wort to be fermented in sufficient quantity to arrive at an acidification such that from twelve to eighteen cubic centimeters of a "normal" solution of soda will be required to neutralize one hundred cubic centimeters of the liquid, substantially as described.

6. A process of manufacturing seed-yeast which consists in forming a high-density wort of a specific gravity of at least 1.0744, cooling down the said wort to fermenting temperature, then adding thereto a concentrated spent wash of a specific gravity of at least 1.129 and an acidity such that from twenty-five to sixty cubic centimeters of a "normal" solution of soda will be required to neutralize one hundred cubic centimeters thereof, until the acidity of the resultant mixture is such that from ten to eighteen cubic centimeters of a "normal" solution of soda will be required to neutralize one hundred cubic centimeters thereof, and then adding seed-yeast thereto to provoke fermentation, substantially as set forth and for the purpose described.

In testimony whereof I have hereunto set my hand in presence of two subscribing witnesses.

HERMAN JANSEN.

Witnesses:
AIRE H. VOONVINDEN,
LEONARD KOOT.